(12) United States Patent
Brouwer et al.

(10) Patent No.: US 6,405,597 B1
(45) Date of Patent: Jun. 18, 2002

(54) FLIP-CHIP MOUNTED PRESSURE SENSOR

(75) Inventors: Theodorus Gerardus Maria Brouwer, Almelo; Daniël Van'T Veen, Borne; Marc Gerard Johan Borgers, Enschede; Ron De Groot, Vroomshoop; Arie Jan Kölling, Enschede, all of (NL)

(73) Assignee: Texas Instruments Incorporated, Attleboro, MA (US)

( * ) Notice: Subject to any disclaimer, the term of this patent is extended or adjusted under 35 U.S.C. 154(b) by 0 days.

(21) Appl. No.: 09/530,010

(22) PCT Filed: Oct. 23, 1998

(86) PCT No.: PCT/NL98/00607

§ 371 (c)(1), (2), (4) Date: Jul. 13, 2000

(87) PCT Pub. No.: WO99/20990

PCT Pub. Date: Apr. 29, 1999

(30) Foreign Application Priority Data

Oct. 23, 1997 (NL) .............................................. 1007339

(51) Int. Cl.⁷ .............................. G01L 9/00; G01L 9/16
(52) U.S. Cl. ...................................................... 73/754
(58) Field of Search ..................... 73/715–727, 754, 73/756; 338/2, 5, 42, 47

(56) References Cited

U.S. PATENT DOCUMENTS

| 4,129,042 A | * 12/1978 | Rosvold ........................ 73/727 |
| 4,763,098 A | 8/1988 | Glenn et al. ................... 73/727 |
| 5,213,676 A | 5/1993 | Reele et al. ................. 205/118 |
| 5,581,038 A | 12/1996 | Lampropoulos et al. ....... 73/721 |
| 5,625,151 A | * 4/1997 | Yamaguchi ................... 73/716 |

FOREIGN PATENT DOCUMENTS

EP 0514723 A1 11/1992

* cited by examiner

Primary Examiner—William Oen
(74) Attorney, Agent, or Firm—Young & Thompson

(57) ABSTRACT

A device for measuring pressure in a space includes a semiconductor component suitable for measuring pressure that is positioned in the space and that has connecting pads for flip-chip mounting, a support element with a flat surface carrying a pattern of conductors onto which the semiconductor component is attached, and spacer elements in the space between the pattern of conductors and the bonding pads of the semiconductor component such that there is a space between the semiconductor component and the surface of the support elements in which space the pressure equals the pressure to be measured.

4 Claims, 1 Drawing Sheet

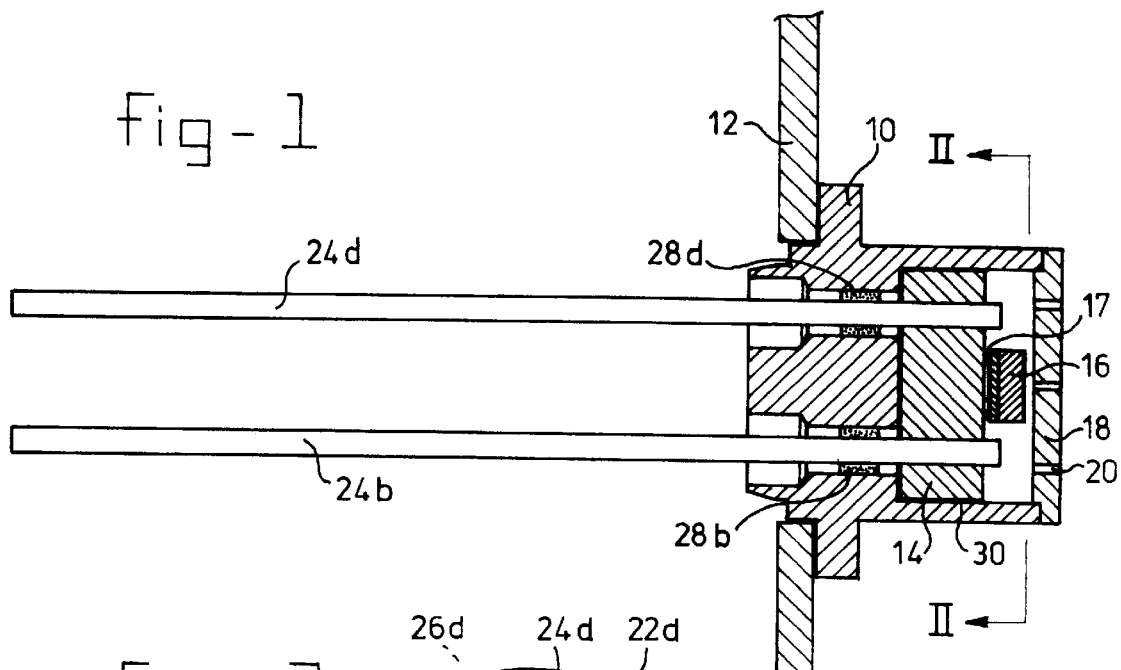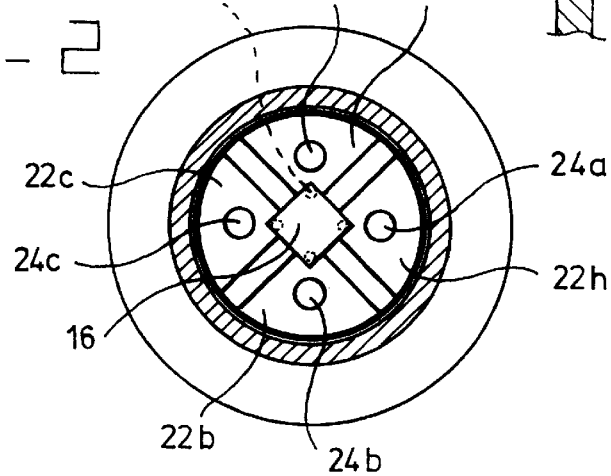

FLIP-CHIP MOUNTED PRESSURE SENSOR

BACKGROUND OF THE INVENTION

The invention relates to a device for performing measurements in a space by means of a chip, especially for measuring the static or dynamic pressure in said space.

Such devices are for instance used in internal combustion engines and diesel engines for measuring the pressure in for instance the internal combustion chamber, the injection conduits, etc.

Such devices can be applied furthermore in the chemical industry where in the process often gases or fluids with a predetermined steady or variable temperature and/or pressure have to be used and whereby the instantaneous value of the temperature and/or pressure forms one of the control parameters of the respective process.

Furthermore such a device can be used for monitoring the temperature and/or pressure in supply tanks in which fluids or gases are stored and maintained under pressure.

It is known to use semiconductor components in these devices for performing the measurements. Thereby the semiconductor component is mounted onto a substrate and is through bonding wires connected to connecting pads or directly to a pattern of conductors. The signals, generated within the semiconductor component under the influence of the measured parameter, are guided to the external surroundings through these bonding wires. Bonding wires have the disadvantage that they are very thin and are therefore very liable to breakage. Furthermore, applying these bonding wires requires the use of specific bonding apparatuses.

In recent times, semiconductor components use so-called flip-chip mounting. No bonding wires are used for mounting these semiconductor components; instead the semiconductor components have connecting surfaces by means of which the components can be directly connected onto a pattern of conductors, for instance by means of soldering. The carrier, onto which the component has to be mounted, comprises a number of connecting surfaces in a corresponding pattern. To mount the semiconductor components on the connecting surfaces of the carrier, small drops of fluid solder are applied and thereafter the semiconductor component is positioned and soldered. More information about this flip-chip method is, for instance, available in U.S. Pat. No. 5,346,857 and U.S. Pat. No. 5,284,796.

If one likes to use these semiconductor components which are destined for flip-chip mounting, especially for performing measurements in environments in which besides the parameter to be measured furthermore strong temperature changes may appear, such as for instance is the case in internal combustion engines and in many chemical processes, then problems will arise in relation to the mounting of the semiconductor component on the carrier. In general, a pressure sensitive chip comprises a membrane, which forms part of the actual pressure measuring chip. With the known semiconductor components destined for bonding wire mounting, this membrane is in the operating situation positioned at the side which is not adjacent to the underlying carrier. An example thereof are described in U.S. Pat. No. 4,763,098. With components for flip-chip mounting, however, this membrane is often at the side which is adjacent to the carrier. Because the solder droplets used during flip chip mounting are very small it is certainly not inconceivable that the distance between the surface of the carrier element and the membrane, if any at all, becomes to small to assure that the pressure at the membrane surface allways equals the pressure to be measured.

SUMMARY OF THE INVENTION

An object of the invention is now to indicate in which manner these problems can be eliminated and in which manner it is therefore possible to assure a correct pressure measurement.

In agreement with said object the invention now provides a device for performing measurements in a space by means of a chip, especially for measuring the static or dynamic pressure in said space, comprising:

- a semiconductor component suitable for the measuring purposes, which component during operation is positioned in said space and has connecting pads for flip-chip mounting,
- a support element comprising a flat surface carrying a pattern of conductors onto which said semiconductor component can be attached, characterized in that spacer elements are installed between the pattern of conductors on the support element and the connecting pads of the semiconductor component such that after performing the flip chip mounting process there is a space between the semiconductor component and said surface of the support element in wich space the pressure equals the pressure to be measured.

BRIEF DESCRIPTION OF THE DRAWINGS

The invention will be explained in more detail in the following description provided with reference to the attached figures.

FIG. 1 illustrates a cross section through a first embodiment of a system according to the invention.

FIG. 2 illustrates a cross section according to the line II—II in FIG. 1.

DESCRIPTION OF THE PREFERRED EMBODIMENTS

The FIGS. 1 and 2 illustrate an embodiment of a device according to the invention. This device comprises a housing 10, which is mounted in a wall 12, surrounding the measuring space. The wall 12 may form part of an engine block or an other component of an internal combustion engine which surrounds a space in which for instance the pressure has to be measured.

The housing 10 comprises at the right hand side in FIG. 1 a chamber in which a disc-shaped carrier element 14 is positioned. On the carrier element a pressure sensitive semiconductor component 16 is mounted by means of flip-chip mounting. At the right hand side in FIG. 1 the chamber is sealed off by means of a lid 18 comprising one or more passages 20 to assure that the pressure in the chamber equals the pressure in the measuring space.

To enable the flip-chip mounting of the pressure sensitive semiconductor component 16 onto the carrier, the surface of the carrier element 14 directed to the lid 18 comprises a conductor pattern which, in this example, comprises four approximately triangular metal layers 22a, 22b, 22c, and 22d. In FIG. 2 these metal layers are separately visible. The mounting side of the semiconductor component 16 comprises four connecting surfaces which, in the mounted situation, are positioned above those parts of the conductor pattern 22a, . . . 22d which are pointing to the center of the disc 14. By means of solder droplets, of which one is indicated in FIG. 2 by the reference number 26d, the semiconductor component 16 is fixed onto the conductor pattern 22a, . . . 22d.

Because in many pressure sensitive chips, destined for flip-chip mounting, the pressure sensitive membrane is present at the underside of the semiconductor component 16, in fact the component 16 has to be maintained at some distance of the disc 14 to assure that the pressure in the measuring space can reach the membrane without hindrance. A solution therefore can be the addition of small spacer elements at the underside of the semiconductor component 16, which spacer elements are functioning as distance keeping elements on the one hand and are functioning as electrical connecting elements on the other hand. It is also possible to thicken the solder areas onto the connector pattern such that therewith the desired intermediate distance between the surface of the semiconductor component 16 and the upper surface of the disc 14 is maintained. In FIG. 1 two of these distance elements are visible, one of which is indicated by 17.

The electrical connection between the conductor pattern 22a, . . . 22d and the outside world is realized by means of four wires or rods 24a, 24b, 24c and 24d. These wires run through the carrier element 14 and extend somewhat above the conductor pattern 22a, . . . 22d such that they can be soldered easily to said conductor pattern. These solder connections are not illustrated separately in the figure. The rods 24a, . . . 24d each run through a feedthrough channel and are fixed in said feedthrough channel by means of a sealing element 28a, 28b, 28c and 28d, of which in FIG. 1 only the sealing elements 28b and 28d are visible.

The material of which the carrier element 14 is made has, according to the invention, a thermal expansion coefficient which mainly is equal to the thermal expansion coefficient of the material of which the pressure sensitive semiconductor 16 is made. If the semiconductor component 16 is made of silicon then it is especially preferred that for the carrier element 14 use is made of ceramic cordorite. The invention is, however, not restricted to this specific material. Also other materials with approximately the same expansion coefficient as silicon can be used for manufacturing the carrier 14. Eventually, the carrier 14 can be made of silicon.

The dimensions of the carrier element 14 are somewhat smaller than the internal dimensions of the chamber inside the housing 10 in which the carrier element is positioned. The carrier element 14 is fixed by means of a sealing mass 30 which fills the gap between the carrier element 14 and the housing 10. This sealing or filling mass should have a sufficient elasticity to withstand changes in shape as a result of the various expansion coefficients of the material of the carrier element and the material of the housing. Furthermore, it should be preferably a material which during the mounting stage is readily processible. It is preferred to use a suitable epoxy.

As is illustrated in FIG. 1 there is a certain intermediate distance between the semiconductor component 16 and the mounting surface of the carrier element 14 to assure that the pressure to be measured reigns indeed at the outside of the membrane which forms part of the actual measuring circuit within the semiconductor component 16. In components for flip-chip mounting this membrane is in general positioned at the underside, i.e. the side which is directed to the mounting surface of the carrier 14. To maintain an intermediate distance also during the mounting it is preferred that the semiconductor component 16 comprises extending parts which are acting for maintaining a certain distance and which can be used furthermore as soldering elements.

During the assembly of the sensor one could perform the following steps. First of all by means of a mould the conductors 24a . . . 24d are positioned within the feedthrough channels in the housing 10. Thereafter the sealing material of the sealing elements 28a . . . 28d is in fluid condition entered in the feedthrough channels and is hardened such that the conductors 24a . . . 24d are fixed in their position. Thereafter the still fluid epoxy layer 30 is coated onto the inner wall of the housing 10 and directly thereafter the carrier element 14 is by means of its passages shifted over the extending ends of the conductors 24a . . . 24d and pressed into the fluid epoxy layer 30.

After hardening of the epoxy layer 30 a solder process is performed whereby both the connection is established between the ends of the conductors 24a . . . 24d and the conductor pattern 22a . . . 22d, whereas on the other hand also the connection can be established between the conductor patterns 22a . . . 22d and the soldering surfaces 26 of the semiconductor component. Because of the choice of materials for the carrier element 14 and the semiconductor component 16 mechanical tensions in the solder connections between the semiconductor 16 and the carrier pattern 22 are not expected. These tensions, however, can appear in the connections between the conductors 24 and the conductor pattern 22. It is therefore preferred to select a solder material with sufficient elasticity to be subjected to changes in shape as a result of the different expansion coefficients of the material of the carrier element and the material of the conductors without breakage.

For the material of the conductor pattern 22a one could select known materials such as copper, brass, etc. From a standpoint of a good adherence to the carrier element 14, a good solderability and a resistance against high temperature it is preferred to use nickel for the conductor pattern 22.

What is claimed is:

1. A pressure sensor comprising:

a housing having a bottom with plural passages and closed side walls;

a support element on said bottom, said support element having plural openings in registration with respective ones of said plural passages;

a seal between said support element and said side walls;

plural conductors on a top surface of said support element;

plural connecting wires that extend through respective ones of said passages and openings and that are soldered to respective ones of said conductors; and a semiconductor chip on said support element and having a pressure sensing membrane and bonding pads on a first surface that faces said support element, said bonding pads being attached to respective ones of said conductors through conductive spacer elements that separate said pressure sensing membrane on said first surface from said support element, said first surface and a second surface of said chip opposite said first surface being exposed to a pressure outside said housing.

2. The pressure sensor of claim 1, wherein each of said conductors is generally triangular with apexes beneath said chip and said bonding pads are attached to the apexes of the respective ones of said conductors.

3. The pressure sensor of claim 1, further comprising a top for said housing, said top having at least one hole therethrough.

4. The pressure sensor of claim 1, further comprising further seals around said connecting wires in said passages through said bottom.

* * * * *